United States Patent [19]

Schneider et al.

[11] Patent Number: 5,199,985

[45] Date of Patent: Apr. 6, 1993

[54] PIGMENT PREPARATION, A PROCESS FOR ITS PREPARATION AND ITS USE

[75] Inventors: Manfred Schneider, Eppstein/Taunus; Rainer Schunck, Bad Soden am Taunus, both of Fed. Rep. of Germany

[73] Assignee: Hoechst AG, Frankfurt am Main, Fed. Rep. of Germany

[21] Appl. No.: 790,997

[22] Filed: Nov. 12, 1991

[30] Foreign Application Priority Data

Nov. 14, 1990 [DE] Fed. Rep. of Germany ....... 4036266

[51] Int. Cl.$^5$ .......................... C08K 5/16; C09D 11/02
[52] U.S. Cl. ................................ 106/493; 106/20 R; 106/499; 552/110
[58] Field of Search .......................... 106/20, 493, 499; 552/110

[56] References Cited

U.S. PATENT DOCUMENTS

| | | | |
|---|---|---|---|
| 3,582,381 | 6/1971 | Papenfuss et al. | 552/110 |
| 3,635,745 | 1/1972 | Rentel et al. | 106/493 |
| 3,652,602 | 3/1972 | Schafer et al. | 552/110 |
| 3,671,553 | 6/1972 | Papenfuss et al. | 552/110 |
| 4,469,516 | 9/1984 | Schneider et al. | 106/503 |
| 4,543,380 | 9/1985 | Schneider et al. | 524/159 |
| 4,773,937 | 9/1988 | Schneider et al. | 106/493 |
| 5,030,283 | 7/1991 | Bender et al. | 106/499 |

FOREIGN PATENT DOCUMENTS 1919724 12/1971 Fed. Rep. of Germany .
1644619 5/1972 Fed. Rep. of Germany .
1769912 2/1973 Fed. Rep. of Germany .
3321998 12/1984 Fed. Rep. of Germany .
1237967 7/1971 United Kingdom .

*Primary Examiner*—Mark L. Bell
*Assistant Examiner*—Helene Klemanski
*Attorney, Agent, or Firm*—Connolly & Hutz

[57] ABSTRACT

The invention relates to readily dispersible pigment preparations having good tinctorial strength based on an arylpararosanilinesulfonic acid pigment of the formula

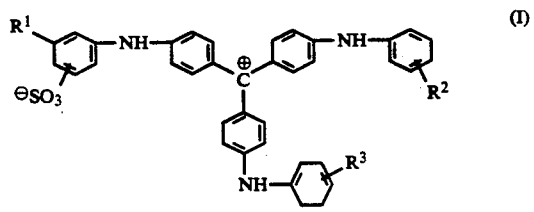

(I)

in which $R^1$, $R^2$ and $R^3$ independently of one another are hydrogen, chlorine or bromine or an alkyl or alkoxy group, each having 1 to 3 carbon atoms, and at least one liquid alcohol having a chain length of $C_8$ to $C_{20}$, preferably $C_{10}$–$C_{15}$, which has been modified with 2 to 8 mol, preferably 3–6 mol, of propylene oxide and with 1–14 mol, preferably 3–10 mol, of ethylene oxide.

The invention furthermore relates to a process for the preparation of these pigment preparations and their use, in particular in printing inks, copying papers or typewriter ribbons.

10 Claims, No Drawings

PIGMENT PREPARATION, A PROCESS FOR ITS PREPARATION AND ITS USE

DESCRIPTION

It is known that the aqueous press cake of the pigments from the series comprising the arylpararosanilinesulfonic acids form particularly hard agglomerates if a simple drying process is employed, owing to the pronounced polar character. When incorporated in the media to be colored, for example printing inks, surface coatings or plastics, these agglomerates must be broken down again with a considerable consumption of mechanical energy. If the deagglomeration is not complete, which is not a seldom occurrence in the very short dispersing time usual today, a large number of very different problems may be encountered during the processing of the pigments. These include, for example, weakly colored prints or prints containing specks or the premature destruction of the printing plate. In order to overcome these difficulties, pigments of this group are frequently used as flushed pastes in special varnishes. Apart from the fact that the flushing process is very time-consuming and, owing to the discontinuous process, is also very expensive and requires complicated apparatus, the flushed pastes are frequently obtained only with a relatively low pigment content (generally between 35 and 45 percent by weight). Furthermore, the high binder content of the flushed pastes gives rise to difficulties in the formulation of special printing ink formulations. In addition, flushed pastes are greatly limited in their possible fields of use by the varnish used in each case, since the hydrophilic character, the tendency to flush, the pigment wetting and other properties of the varnish must be taken into account in the production process. This makes optimization for the intended use very difficult. Therefore, for example, the pigments flushed into oxidatively drying varnishes cannot be used for the production of carbon papers or typewriter ribbons.

Emptying of containers with flushed pastes presents a further problem for the processor since the highly viscous and tenacious pastes have to be removed with considerable mechanical effort and with losses.

Powder preparations of the arylpararosanilinesulfonic acid pigments with natural resins or modified natural resins are known (cf. British Patent 1,237,967). However, they no longer meet the present-day requirements of the printing ink industry with regard to dispersibility, tinctorial strength, processing characteristics and formulation latitude of the printing ink formulations. Moreover, these natural resins in the form in which they are supplied are solid resin-like chips or fragments which are relatively readily soluble in organic solvents but go into solution in the aqueous alkaline medium only after a long time and with heating and furthermore only when their acid value is greater than about 80 mg of KOH/g. Preparations containing as-synthesized resins (cf. German Patent 2,014,299) are also known. Because of their still considerable content of water-incompatible solvents as solubilizers, these lead to annoying odors when used in industry. Furthermore, the concomitant use of surfactants is necessary and impairs the substantivity of the resins in that a marked proportion of the resin is not bound to the pigment but, after isolation of the prepared pigment, passes with the mother liquor into the wastewater. Furthermore, the filtration of the precipitated pigment preparation is made more difficult owing to the content of surfactant.

The preparations based on arylpararosanilinesulfonic acid pigments and certain water-soluble polyester resins, which are described in U.S. Pat. No. 4,543,380, have proved in practice to be insufficiently dispersible in the recently used dispersing units, such as stirred ball mills.

It has now been found that the arylpararosanilinesulfonic acid pigments can be prepared in the form of readily dispersible preparations, for example pigment powders having a high tinctorial strength and soft textured particles, with a substantially wider range of applications in the various binders conventionally used in the printing ink industry, if water-soluble alcohols reacted with propylene oxide and ethylene oxide, preferably liquid oxo alcohols, having a $C_8$–$C_{20}$-chain are used as sensitizing agents.

The invention therefore relates to a pigment preparation based on an arylpararosanilinesulfonic acid pigment of the formula

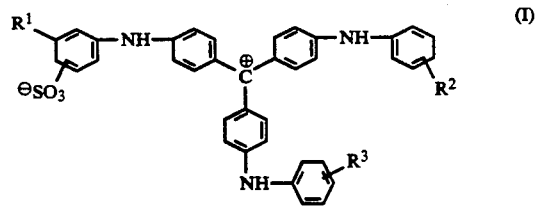

in which $R^1$, $R^2$ and $R^3$ independently of one another are hydrogen, chlorine or bromine or an alkyl or alkoxy group, each having 1 to 3 carbon atoms, and at least one alcohol, preferably a liquid oxo alcohol, having a chain length of about $C_8$ to $C_{20}$, preferably $C_{10}$ to $C_{15}$, which has been modified with about 2 to 8 mol, preferably 3 to 6 mol, of propylene oxide and with about 1 to 14 mol, preferably 3 to 10 mol, of ethylene oxide. The above ranges with regard to the number of carbon atoms and the amount of propylene oxide or ethylene oxide may in principle be exceeded to a certain extent in a downward or upward direction, but in general it will then be necessary to accept certain deteriorations, such as more disadvantageous substantivity or more disadvantageous foaming behavior and the like.

The invention furthermore relates to a process for the preparation of this pigment preparation and its use, in particular in printing inks, copying papers and typewriter ribbons.

Pigments of the formula (I) and their preparation are disclosed in, for example, U.S. Pat. Nos. 3,652,602 and 3,671,553, which are hereby incorporated by reference. In principle, other colored pigments having a similar structure and/or polarity may also be used according to the invention.

The modified oxo alcohols preferably contained in the pigment preparation according to the invention are usually used as low-foam cleaning agents, and it was completely surprising that these products have such outstanding substantivity with the arylpararosanilinesulfonic acid pigments. It was also surprising that the pigments sensitized therewith are so outstandingly dispersible in hydrophobic media.

The alcohols according to the invention, preferably oxo alcohols, have a chain length of, in general, about $C_8$–$C_{20}$, preferably $C_{10}$–$C_{15}$. The so-called fatty alcohols may be mentioned as examples of these, such as octanol, decanol, dodecanol (lauryl alcohol), tetradecanol (myristyl alcohol), hexadecanol (cetyl alcohol), octadecanol (stearyl alcohol), octadecenol (oleyl alcohol), 1-nonadecanol, 1-eicosanol (arachidyl alcohol), 1-heneicosanol, 1-docosanol (behenyl alcohol), 1-tricosanol and 1-tetracosanol (lignoceryl alcohol).

Preferred alcohols according to the invention are the so-called oxo alcohols, i.e. the alcohols obtained from olefins in the oxo process, such as 2-ethylhexyl, isooctyl, isononyl, isodecyl, isotridecyl and isohexadecyl alcohol, and corresponding mixtures of primary, secondary and tertiary, branched and straight-chain alcohols. In this context, see also the brochure "Produkte aus der Oxo-Synthese" [Products of the oxo process], Farbwerke Hoechst AG, 2nd Edition (1971), pages 69 et seq.

According to the invention, these alcohols are reacted with about 2 to 8 mol, preferably with 3 to 6 mol, of propylene oxide and about 1 to 14 mol, preferably 3 to 10 mol, of ethylene oxide. These reaction products are, as a rule, liquid and water-soluble and generally have a turbidity point (1% strength solution in water) of about 10° to 70° C., preferably 20° to 50° C., and a pH of, preferably, 6 to 8 (measured for the pure substance). It is also possible to use mixtures of different modified alcohols, and also mixtures comprising alcohols which are modified only with propylene oxide and alcohols which are modified only with ethylene oxide, although this embodiment is less preferred.

The optimum amount of propylene oxide and ethylene oxide used for modifying the alcohol depends, inter alia, also on the chain length of the alcohol; in the case of amounts of propylene oxide and ethylene oxide which are at the upper limit of the above ranges, the number of carbon atoms of the alcohol to be modified should in general also be correspondingly high.

The amount of modified alcohol is as a rule 1 to 20 percent by weight, preferably 2 to 12 percent by weight, based on the weight of the dry starting pigment, and depends on the pigment and the subsequent field of use of the preparation.

The pigment preparation according to the invention is prepared by a method in which the pigments (I) are first dissolved in water with the addition of alkalis and, advantageously, with heating to 50°-100° C., preferably 80°-100° C., and, after the addition of the modified alcohol or of a corresponding mixture, the sensitized pigment is precipitated from the resulting, aqueous alkaline pigment solution by means of a mineral acid with a pH of 1 to 5, preferably 1 to 3.5.

It is also possible to first precipitate the pigments (I) dissolved in aqueous alkaline solution by adding a mineral acid, then to add the modified alcohol or a corresponding mixture, to stir and finally to isolate the sensitized pigment, e.g. by means of a press, followed by drying and grinding. Application technology properties such as tinctorial strength and dispersibility can be adjusted to a certain degree by variation of the stirring time after precipitation of the pigments.

Sodium hydroxide and potassium hydroxide are most suitable for the preparation of the aqueous alkaline pigment solution; however, it is also possible in principle to use other bases, such as lithium hydroxide.

A suitable mineral acid is, preferably, sulfuric acid or a hydrohalic acid, such as hydrochloric acid.

Because organic solvents are completely dispensed with, during sensitizing of the pigment there is absolutely no annoying odor and the filtrate contains no environmental pollutants.

After drying of the moist, pressed-out pigment preparation, the process according to the invention gives a product which has soft textured particles, can readily be milled and does not tend to agglomerate.

Since the modified alcohols used according to the invention or mixtures thereof are adsorbed virtually exclusively onto the pigment to be sensitized in the sensitizing method according to the invention, the pigment preparations produced in this manner, after drying at about 80° C., preferably 70° to 100° C., have outstanding dispersibility in the various printing ink binders conventionally used in practice. The pigment preparations according to the invention are therefore suitable in particular for use in printing inks, copying papers and typewriter ribbons.

Another particular advantage of the invention is that the pigment preparations obtained thereby can be extremely readily dispersed with the dispersing units conventionally used in the printing ink industry. This applies in particular to the stirred ball mills increasingly used here. In the case of these, it is particularly important that the premixed milling mixture is thoroughly wet and has good flow. Insufficiently wet pigment can in fact result in a sharp increase in viscosity and consequently local overheating during the dispersing process, with the known adverse effects on the resulting printing ink. At the relatively low shear forces in the stirred ball mill, good wetting and easy divisibility of the pigment is particularly important. The alkali blue powders developed to date for the intensive dispersing action of the three-roll mill are not sufficiently readily dispersible under the mild conditions in the stirred ball mills. On the other hand, even after the brief action of mild shearing conditions, the products prepared according to the invention exhibit a substantially higher tinctorial strength, which increases only slightly on longer dispersing, i.e. the powders according to the invention reach virtually the full final tinctorial strength after very brief dispersing whereas the products known to date require substantially longer and more intensive dispersing in order to reach the same final tinctorial strength.

The preparations according to the invention in powder form have a tinctorial strength about twice as great as that of flushed pastes, so that, in the formulation of printing inks, a greater latitude remains for property-improving additives. Owing to the low content of sensitizing agent and the consequent small effect on the viscosity in the formulation of printing inks, the powder preparations have a wider range of uses.

The preparations according to the invention have an unlimited shelf life whereas flush pastes thicken, especially as a result of heating, and therefore can be stored for only a limited time. They are more readily meterable, can be removed quantitatively from the containers and can, for example, be pneumatically transported from a storage bin to the processing apparatus and automatically metered.

When the pigment preparations according to the invention are used for the preparation of special flushed pastes, the flow behavior and the tack of the prepared pastes can be influenced within wide limits by the content of sensitizing agent. The readiness of the sensitized press cake to flush is substantially increased and can be tailored to the flushing agents used by the chosen content of sensitizing agent The elimination of water takes place more completely, with the result that the subsequent drying phase can be shortened.

The invention is illustrated in more detail in the Examples which follow.

EXAMPLE 1

408 parts by weight of a water-moist press cake, containing 24.5 percent by weight of the triphenyl-pararosanilinemonosulfonic acid of the formula

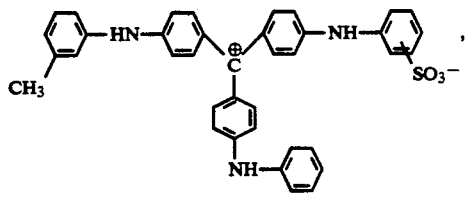

were suspended after the addition of 2,000 parts by weight of water, while stirring. After the addition of 19.5 parts by weight of sodium hydroxide, the mixture was heated to 90°-100° C., the pigment being completely dissolved.

7 parts by weight of a $C_{12}$–$C_{15}$-oxo alcohol, which had been modified with 5 mol of propylene oxide and 5 mol of ethylene oxide, were added to the hot pigment solution.

The mixture was stirred for 10 minutes, and the sensitized pigment was then precipitated by adding 165 parts by weight of a 17 percent strength sulfuric acid. The preparation was filtered off under suction, washed substantially salt-free and dried at 70°-80° C. for 24 hours in a forced-draught drying oven. The mother liquor had a pH of 2.3 and was slightly pink. 105.8 parts by weight of a 94 percent strength by weight blue pigment preparation were obtained. The pigment preparation was milled and could be incorporated very readily and with little dispersing effort into a book offset varnish and into a flexographic varnish to give printing inks having good tinctorial strength.

EXAMPLE 2

The procedure described in Example 1 was followed, except that the moist press cake washed substantially salt-free was isolated. 619 parts by weight of water-moist pigment preparation resulted. This water-moist press cake could be converted into a readily flowing suspension by adding only 3 g of a commercial liquefying agent (dinaphthalenemethanesulfonate) with stirring and could be dried to give a free-flowing powder with a spray dryer at an inlet temperature of 180°-190° C. and an outlet temperature of 90°-95° C. The powder could be processed very readily and with little dispersing effort to give speck-free printing inks having good tinctorial strength.

EXAMPLE 3

408 parts by weight of a moist press cake, containing 24.5 percent by weight of the triphenyl-pararosanilinemonosulfonic acid of the formula

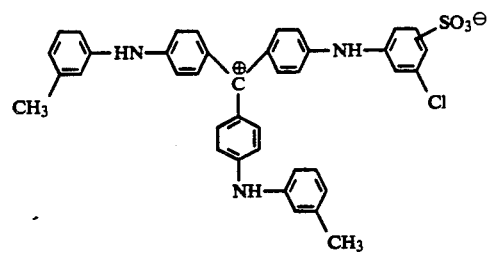

were suspended after the addition of 1,900 parts by weight of water, while stirring. After the addition of 21 parts by weight of sodium hydroxide, the mixture was heated to 90°-100° C., the pigment going completely into solution. 10 parts of an oxo alcohol having 10°-12 carbon atoms, which had been modified with 4 mol of propylene oxide and 4 mol of ethylene oxide and had a turbidity point of about 20° C. and a pH of 6-8, were added to the hot pigment solution. The mixture was stirred for 10 minutes, and the sensitized pigment was then precipitated by adding 170 parts by weight of a 17% strength sulfuric acid. The preparation was filtered off under suction, washed salt-free and dried at 70°-80° C. for 24 hours in a forced-draught drying oven.

109 parts by weight of a 91.7 percent strength by weight blue pigment powder which had a green shade and could be very readily processed to give speck-free printing inks having good tinctorial strength resulted.

EXAMPLE 4

408 parts by weight of a moist press cake, containing 24.5 percent by weight of the triphenyl-pararosanilinemonosulfonic acid of the formula

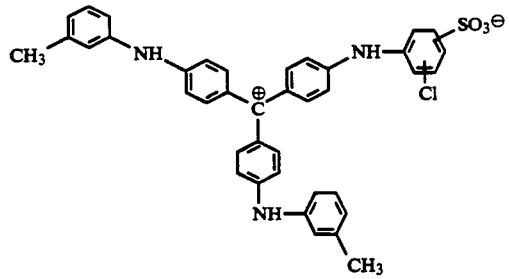

were suspended after the addition of 2,000 parts by weight of water, while stirring. After the addition of 20 parts by weight of sodium hydroxide, the mixture was heated to 90°-100° C., the pigment being completely dissolved. After the addition of 2 parts by weight of a $C_{12}$–$C_{15}$ oxo alcohol, modified with 4 mol of propylene oxide and 9 mol of ethylene oxide, and 3 parts by weight of a $C_{12}$–$C_{15}$ oxo alcohol, modified with 5 mol of propylene oxide and 5 mol of ethylene oxide, stirring was continued for 10 minutes and the sensitized pigment was precipitated by adding 170 parts by weight of a 17 percent strength sulfuric acid. After filtration, 630 parts by weight of moist sensitized pigment press cake resulted. This press cake was flushable in portions with 130 parts by weight of a linseed oil flush paste without difficulties. The water elimination was 92 percent by weight. After removal of the residual amount of water by drying in vacuo, a flush paste of about 45 percent strength by weight and having good tack and outstanding fineness and tinctorial strength was obtained.

EXAMPLE 5

The procedure described in Example 1 was followed, except that the pigment dissolved in aqueous alkaline solution first was precipitated with sulfuricacid and then 5 parts by weight of a $C_{12}$–$C_{15}$-oxo alcohol, which had been modified with 5 mol of propylene oxide and 5 mol of ethylene oxide, were added to the pigment suspension. The mixture was stirred for 10 minutes. The preparation was filtered off under suction, washed substantially salt-free and dried at 70°–80° C. for 24 hours in a forced-draught drying oven. The mother liquor had a pH of 2.3 and was slightly pink. 105.8 parts by weight of a 94 percent strength by weight blue pigment preparation were obtained. The pigment preparation was milled and could be incorporated very readily and with little dispersing effort into a book offset varnish and into a flexographic varnish to give printing inks having good tinctorial strength.

We claim:

1. A pigment preparation based on an arylpararosanilinesulfonic acid pigment of the formula (I)

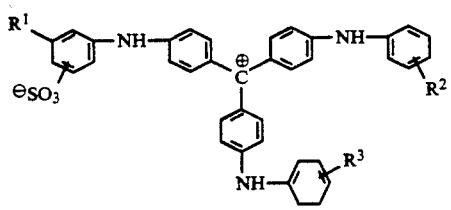

in which $R^1$, $R^2$ and $R^3$ independently of one another are hydrogen, chlorine or bromine or an alkyl or alkoxy group, each having 1 to 3 carbon atoms, and at least one alcohol having a chain length of $C_8$ to $C_{20}$, which has been modified with 2 to 8 mol of propylene oxide and with 1 to 14 mol of ethylene oxide.

2. A pigment preparation as claimed in claim 1, wherein the alcohol is an oxo alcohol.

3. A pigment preparation as claimed in claim 1 wherein the alcohol has a chain length of $C_{10}$–$C_{15}$ and has been modified with 3 to 6 mol of propylene oxide and with 3 to 10 mol of ethylene oxide.

4. A pigment preparation as claimed in claim 1, wherein the modified alcohols used have a turbidity point between 20° and 50° C.

5. A pigment preparation as claimed in claim 1 which contains 1 to 20 percent by weight, based on dry starting pigment, of modified alcohol.

6. A process for the preparation of the pigment preparation as claimed in claim 1 wherein the pigment based on (I) is first dissolved in an alkaline aqueous medium, adding the modified alcohol or a mixture of modified alcohols and adding a mineral acid to precipitate a sensitized pigment.

7. A process for the preparation of the pigment preparation as claimed in claim 1 wherein the pigment of formula (I) is first dissolved in an alkaline aqueous medium, the pigment is then precipitated by adding a mineral acid, the modified alcohol or a corresponding mixture of modified alcohols is then added, the resulting mixture is stirred and finally the pigment is isolated, dried and ground to form a sensitized pigment.

8. A process as claimed in claim 6, wherein dissolution of the pigment is carried out at 50° to 100° C.

9. The process as claimed in claim 6 wherein the pigment is precipitated from the alkaline solution at a pH of 1 to 5.

10. A printing ink, copying paper or typewriter ribbon which contains a pigment preparation as claimed in claim 1.

* * * * *